US009985725B2

(12) United States Patent
Vall-Llosera et al.

(10) Patent No.: US 9,985,725 B2
(45) Date of Patent: May 29, 2018

(54) NETWORK UNIT AND METHOD FOR MONITORING A FIBER LINE

(71) Applicant: TELEFONAKTIEBOLAGET L M ERICSSON (PUBL), Stockholm (SE)

(72) Inventors: Gemma Vall-Llosera, Järfälla (SE); Boris Dortschy, Hägersten (SE); Patryk Urban, Vällingby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days. days.

(21) Appl. No.: 14/895,395

(22) PCT Filed: Sep. 24, 2013

(86) PCT No.: PCT/SE2013/051109
§ 371 (c)(1),
(2) Date: Dec. 2, 2015

(87) PCT Pub. No.: WO2014/196909
PCT Pub. Date: Dec. 11, 2014

(65) Prior Publication Data
US 2016/0112119 A1  Apr. 21, 2016

(30) Foreign Application Priority Data

Jun. 4, 2013 (WO) .................. PCT/SE2013/050644

(51) Int. Cl.
*H04B 10/08* (2006.01)
*H04B 17/00* (2015.01)
(Continued)

(52) U.S. Cl.
CPC ..... *H04B 10/071* (2013.01); *H04B 10/25752* (2013.01); *H04B 10/40* (2013.01);
(Continued)

(58) Field of Classification Search
CPC .............. H04B 10/0771; H04J 14/0282; H04J 14/0246; H04J 14/0227
(Continued)

(56) References Cited

U.S. PATENT DOCUMENTS 5,907,417 A   5/1999 Darcie et al.
6,538,781 B1  3/2003 Beierle et al.
(Continued)

FOREIGN PATENT DOCUMENTS

EP   0615358 B1   10/2004
EP   2034635 A1   3/2009
(Continued)

OTHER PUBLICATIONS

Yuksel, et al., Optical Layer Monitoring in Passive Optical Networks (PONs): A Review, International Conference on Transparent Optical Networks (ICTON), pp. 92-98, Jun. 22, 2008.
(Continued)

*Primary Examiner* — David Payne
*Assistant Examiner* — Pranesh Barua

(57) ABSTRACT

Embodiments herein relate to a method in a network unit for monitoring a fiber line between a radio base station and a radio head in a Fiber to the Radio Head communications network. The Fiber to the Radio Head communications network comprises a ring architecture or a tree architecture of fiber, with Subcarrier Multiplexing, SCM, downstream transmissions and Wavelength Division Multiplexing, WDM, upstream transmissions. The monitoring comprises that the network unit detects an indication of a fault along the fiber line based on monitoring power. The network unit initiates, in response to detect the indication, an Optical× Domain Reflectometry, O×DR, measurement over the fiber line. Additionally, the network unit analyses a trace from the
(Continued)

OxDR measurement for localizing the fault or for deciding that the indicated fault is not a fault along the fiber line.

19 Claims, 8 Drawing Sheets

(51) Int. Cl.
| | | |
|---|---|---|
| *H04B 10/071* | (2013.01) | |
| *H04J 14/02* | (2006.01) | |
| *H04B 10/40* | (2013.01) | |
| *H04B 10/2575* | (2013.01) | |

(52) U.S. Cl.
CPC .......... *H04J 14/02* (2013.01); *H04J 14/0265* (2013.01); *H04J 14/0298* (2013.01); *H04J 14/0249* (2013.01); *H04J 14/0282* (2013.01); *H04J 14/0283* (2013.01)

(58) Field of Classification Search
USPC .............................. 398/9, 10, 16, 17, 25, 33
See application file for complete search history.

(56) References Cited

U.S. PATENT DOCUMENTS

| | | | | |
|---|---|---|---|---|
| 7,826,691 | B2* | 11/2010 | Matthijsse | H04B 10/2581 385/123 |
| 8,588,571 | B1* | 11/2013 | Lam | G02B 6/3825 385/135 |
| 8,655,167 | B1* | 2/2014 | Lam | H04B 10/071 398/16 |
| 8,693,866 | B1* | 4/2014 | Lam | H04B 10/071 398/13 |
| 8,724,102 | B2 | 5/2014 | Urban | |
| 2004/0032642 | A1* | 2/2004 | Imai | H01S 3/302 359/334 |
| 2006/0215545 | A1* | 9/2006 | Nelson | H04B 10/0799 370/216 |
| 2007/0147838 | A1 | 6/2007 | Kim et al. | |
| 2007/0258713 | A1* | 11/2007 | Jung | H04J 14/0226 398/71 |
| 2008/0056731 | A1* | 3/2008 | Weber | H04B 10/0793 398/197 |
| 2008/0131114 | A1* | 6/2008 | Jang | H04B 10/0771 398/13 |
| 2008/0131125 | A1* | 6/2008 | Byoung Whi | H04B 10/2587 398/72 |
| 2008/0145048 | A1* | 6/2008 | Wu | H04B 10/071 398/25 |
| 2008/0175587 | A1* | 7/2008 | Jensen | H04L 1/22 398/2 |
| 2009/0010643 | A1* | 1/2009 | DeLew | H04B 10/079 398/17 |
| 2010/0260496 | A1* | 10/2010 | Tosetti | H04B 10/2587 398/7 |
| 2014/0147109 | A1* | 5/2014 | Urban | G01M 11/3136 398/20 |
| 2015/0139637 | A1 | 5/2015 | Vall-Llosera et al. | |
| 2015/0215032 | A1* | 7/2015 | Bevilacqua | H04J 14/0267 398/5 |

FOREIGN PATENT DOCUMENTS

| | | |
|---|---|---|
| WO | 2013012361 A1 | 1/2013 |
| WO | 2014189423 A1 | 11/2014 |

OTHER PUBLICATIONS

Ghazisaidi, et al., Fiber-Wireless (FiWi) Access Networks: A Survey, IEEE Communications Magazine, vol. 47, No. 2, pp. 160-167, Feb. 2009.

Urban, et al., Fiber Plant Manager: An OTDR- and OTM-Based PON Monitoring System, IEEE Communications Magazine, vol. 51, Issue 2, Feb. 2013, pp. S9-S15.

Urban, et al., WDM-PON Fiber-Fault Automatic Detection and Localization with 1dB Event Sensitivity in Drop Links, Proceedings of National Fiber Optic Engineers Conference, NFOEC 2012, Los Angeles, USA, Mar. 2012.

Pan, et al., Optical performance monitoring for the next generation optical communication networks, Optical Fiber Technology, vol. 16, Issue 1, Jan. 2010, pp. 20-45.

El-Nahal, et al., Bidirectional WDM-PON architecture using a reflective filter and cyclic AWG, Optik, vol. 122, Issue 19, Oct. 2011, pp. 1776-1778.

Series G: Transmission Systems and Media, Digital Systems and Networks, Digital sections and digital line system—Optical line systems for local and access networks, Gigabit-capable Passive Optical Networks (G-PON): Physical Media Dependent (PMD) layer specification, ITU-T G.984.2 Amendment 2, International Telecommunication Union Telecommunication Standardization Sector of ITU, Mar. 2008.

Qiu, et al., A Simple Multicast Overlay Scheme for WDM Passive Optical Networks with Symmetric Two-Way Traffic, Optoelectronics and Communications Conference, Jul. 13, 2009.

* cited by examiner

NETWORK UNIT AND METHOD FOR MONITORING A FIBER LINE

This application is a 371 of International Application No. PCT/SE2013/051109, filed Sep. 24, 2013, which claims the benefit of International Application No. PCT/SE2013/050644, filed Jun. 4, 2013, the disclosure of which is fully incorporated herein by reference.

TECHNICAL FIELD

Embodiments herein relate to a computer program product, a network unit and a method therein for monitoring a fiber line in a 'Fiber to the Radio head communications' network.

BACKGROUND

In a typical radio communications network, wireless terminals, also known as mobile stations and/or user equipment (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. The base stations communicate over the air interface operating on radio frequencies with the UE within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA). In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3rd Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base station nodes without reporting to RNCs.

Increased traffic levels and end-user expectations around data rates and latency are some of the parameters that drive a network change. Mobile broadband operators are updating their networks to enable higher speeds and higher bandwidth by adding more frequency bands to existing macro site, and if that is not enough densifying macro cells and deploying other small cell scenarios.

In urban city streets and squares, outdoor micro cells are attractive, as they have sufficient power both to cover a sizeable outdoor area and reach indoor users on lower floors of buildings. If a fiber line is available for carrying data transmissions, micro Remote Radio Units (RRU) may be deployed. For small indoor hotspots such as cafés, where stand-alone Wi-Fi is often already deployed, and so sites are available, operators may deploy indoor pico Radio Base Stations (pRBS), backhauled over an available fixed broadband. In certain in-building situations—such as stadiums, shopping malls, train stations, airports and offices a mix of cell types may be used, depending of the nature of the building and on the backhaul available. Fiber networks in combination with other networks, e.g. wireless communication networks are becoming more and more common. One particular example of such a combination is to connect a standard base station to a distributed antenna system by means of passive or active components. In an example, optical fiber connects the base station to a remote unit which in turn connects to the antennas. Fiber cabling enables the use of RRUs, pRBS and also the recently proposed architecture 'Fiber to the Radio head' (FTTRh), where a radio head is detached from the RBS and a fiber line reaches the radio head also called antenna radio head. The radio head being a unit for transmitting signals over the air to/from a user equipment. In this case, analogue transmission is considered between the radio head (Rh) and RBS to save in complexity and costs.

Optical Line Supervision (OLS) relates to a set of capabilities or parameters for the measurement and reporting of the state of an optical link, such as a fiber line, as defined in the ITU-T Recommendation G.984.2 Amendment 2, e.g. Transceiver temperature of an optical line termination (OLT) and optical network termination (ONT); Transceiver voltage of OLT and ONT; Laser bias current of OLT and ONT; OLT transmit power; OLT receive power per ONT; ONT transmit power; ONT receive power. OLT is a device that terminates the common (root) endpoint of an Optical Distribution Network (ODN), implements a Passive Optical Network (PON) protocol and adapts PON Packet Data Units (PDU) for uplink communications over the provider service interface. The OLT provides management and maintenance functions for the subtended ODN and optical network units (ONU). ONT is a single subscriber device that terminates any one of the distributed (leaf) endpoints of an ODN, implements a PON protocol, and adapts PON PDUs to subscriber service interfaces. An ONT is a special case of an ONU. An ONU is generic term denoting a device that terminates any one of the distributed (leaf) endpoints of an ODN, implements a PON protocol, and adapts PON PDUs to subscriber service interfaces. In some contexts, an ONU implies a multiple subscriber device.

It is the purpose of the ITU-T Recommendation G.984.2 Amendment 2 to describe the physical layer measurements to support OLS capability. In any ODN systems, physical monitoring for OLS may be used for: a) normal status monitoring: get and buffer 'historic' data as a reference in a normally working system; b) degradation detection: find the potential faults before they become service-affecting, and identify the source of the problem, e.g., ODN, Optical Backend Terminal (OBT) or Optical Front end Terminal (OFT); c) fault management: detect, localize and diagnose faults.

For wireless networks, two physical layer parameters that read the received or transmitted powers are standardized, Received Signal Strength Indicator (RSSI) and Transmitted Signal Strength Indicator (TSSI). As for optical networks, in a wireless network, RSSI/TSSI may be used for: a) normal status monitoring: get and buffer 'historic' data as a reference in a normally working system; b) degradation detection: find the potential faults before they become service-affecting, and identify the source of the problem; c) fault management: detect, localize and diagnose faults. Existent monitoring solutions are focused on data transmissions in the optical domain and are not very efficient nor very accurate in an FTTRh communications network.

SUMMARY

An object of the embodiments herein is to provide a solution for monitoring a fiber of an FTTRh communications network that is efficient and accurate.

According to an aspect of embodiments herein the object is achieved by a method in a network unit for monitoring a fiber line between a radio base station and a radio head in a Fiber to the Radio head communications network. The Fiber to the Radio head communication network has a ring architecture or a tree architecture of fiber, with Subcarrier Multiplexing, SCM, downstream transmissions and Wavelength Division Multiplexing, WDM, upstream transmissions. The monitoring is performed in the network unit wherein the network unit detects an indication of a fault along the fiber line based on monitoring power. The network unit, in response to detect the indication, initiates an Optical×Domain Reflectometry, O×DR, measurement over the fiber line. The network unit analyses a trace from the O×DR measurement for localizing the fault or for deciding that the indicated fault is not a fault along the fiber line.

According to another aspect the object is achieved by a network unit for monitoring a fiber line between a radio base station and a radio head in a Fiber to the Radio head communications network. The Fiber to the Radio head communications network comprises a ring architecture or a tree architecture of fiber, with SCM downstream transmissions and WDM upstream transmissions. The network unit comprises, for monitoring the fiber line, a detecting circuit configured to detect an indication of a fault along the fiber line based on monitored power. The network unit further comprises an O×DR circuit configured to initiate, in response when the indication is detected, an O×DR measurement over the fiber line. The network unit also comprises an analyzing circuit configured to analyse a trace from the O×DR measurement for localizing the fault or for deciding that the indicated fault is not a fault along the fiber line.

According to yet another aspect the object is achieved by providing a computer program product comprising computer-executable instructions which, once executed by a processor in a network unit, causes the network unit to perform a method according to the embodiments herein.

An advantage with the provided solution is that it enables detection and localization of a fault in the fiber line in an FTTRh communications network conforming a ring topology or a tree topology. This may be done by means of using standard OLS, and RSSI/TSSI parameters and O×DR techniques. The solution enables an efficient aggregation/multiplexing technique in downlink/uplink direction using SCM in downlink transmissions and WDM uplink transmissions for deep fiber penetration scenarios such as in FTTRh communications networks.

BRIEF DESCRIPTION OF THE DRAWINGS

Embodiments will now be described in more detail in relation to the enclosed drawings, in which.

DETAILED DESCRIPTION

Figure 1:
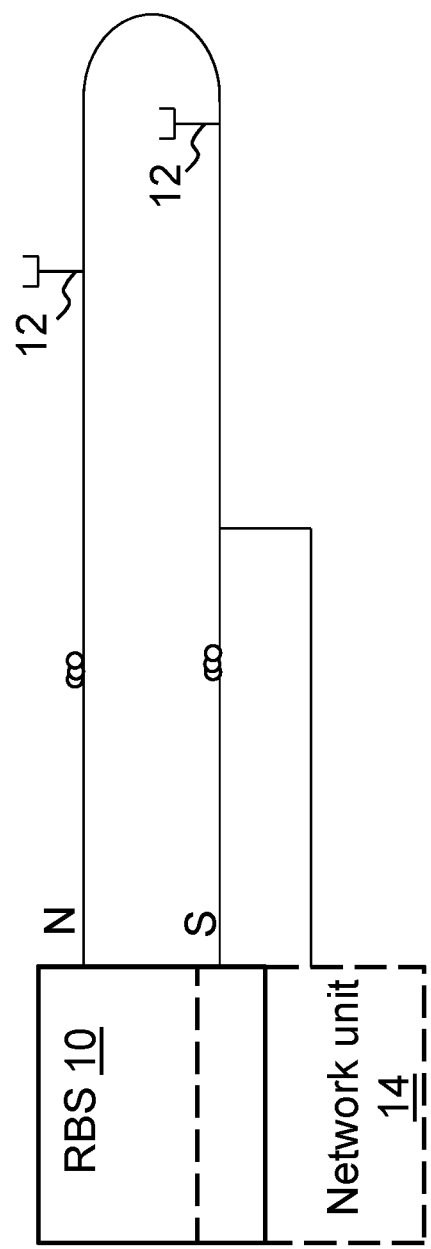
FIG. 1 shows a block diagram depicting an FTTRh communications network according to embodiments herein.

A network for an FTTRh deployment, also called FTTRh communications network, using analogue radio-over-fiber (RoF) is shown in FIG. 1. As stated above the FTTRh communications network is where one or more radio heads are detached from a RBS and a fiber line reaches each radio head. Briefly, an RBS 10 situated in a centralized location such as RBS hotel or Central Office (CO) is connected to a North (N) branch and a South (S) branch of the fiber line illustrated as a trunk fiber ring. The trunk fiber ring connects several radio heads 12 and these radio heads 12 may comprise or be connected to the fiber line via optical nodes which are equipped with two in/through optical ports, and an internal add-drop path which connects to an antenna unit. The radio head 12 e.g. with the antenna unit may be considered as a Radio over Fiber Slave unit in connections with a Radio over Fiber Master e.g. arranged in the RBS 10. Embodiments herein concern a wavelength panel composed of one main carrier plus several subcarriers for downstream transmissions, a so called subcarrier multiplexing (SCM), and coarse wavelength division multiplexing (WDM) for upstream transmissions. Upstream light, i.e. towards the RBS 10, and downstream light, i.e. from the RBS 10, from and to one node follows always the same path and experiences basically the same, symmetric, path loss. The ring structure is just for resilience reasons and embodiments herein may also be implemented in a tree structure. Embodiments herein provide a network unit 14 for monitoring the fiber line. The network unit 14 detects an indication of a fault along the fiber line based on monitoring power. The network unit 14 initiates, when indication is detected, an Optical x Domain Reflectometry (O×DR) measurement over the fiber line, and analyses a trace from the O×DR measurement for localizing the fault or for deciding that the indicated fault is not a fault along the fiber line. The network unit 14 may be implemented as a stand-alone unit, integrated or transceiver embedded solution, e.g. collocated with the RBS 10, depending on needs.

Embodiments herein may detect and localize a fault in an FTTRh deployment conforming a ring topology or a tree topology by means of using standard OLS and RSSI/TSSI parameters and OxDR techniques.

The method actions in the FTTRh communications network for monitoring the fiber line according to some embodiments will now be described with reference to a flowchart depicted in FIG. 2. The Fiber to the Radio head communications network comprises a ring architecture or a tree architecture of fiber, with SCM downstream transmissions and WDM upstream transmissions. The actions do not have to be taken in the order stated below, but may be taken in any suitable order. Actions performed in some embodiments are marked with dashed boxes. The monitoring may comprise the following actions.

Action 201. In some embodiments the network unit 14 compares transmit power of a laser diode in a Radio over Fiber (RoF) master against a threshold value. This may be performed in order to determine that the laser diode is working properly. The RoF master may be comprised in the radio base station 14 or another node in the FTTRh communications network.

Action 202. The network unit 14 may, when transmit power exceeds the threshold value, check the laser diode. Thus, the network unit 14 may be configured to check that the laser diode in the RoF master is working properly before continuing monitoring the fiber line.

Action 203. The network unit 14 detects an indication of a fault along the fiber line based on monitoring power. For example, the network unit 14 may read receiver (Rx) power from a photo diode in the RoF master and based on that detect the indication of fault by e.g. compare the Rx power with a threshold. Furthermore, the network unit 14 may detect upstream power to the RoF master and based on that detect the indication of fault. Additionally or alternatively, the network unit 14 may detect received power at the network unit 14 from the fiber line and based on that detect the indication of fault.

Action 204. For localizing the fault in the fiber line or for deciding that the indicated fault is not a fault along the fiber line, the network unit 14, in response to detect the indication, initiates an OxDR measurement over the fiber line. Optical reflectometry is a powerful technique for characterization of the status of optical components and modules, optical fibers, etc. Any OxDR technique works by analyzing the distribution of the back-reflected light along a fiber-optic transmission link, such as the fiber line. The magnitude, frequency of the backscattered signal is dependent on a Rayleigh backscattering coefficient, attenuation, fiber imperfections and splices, and optical power level in the fiber line. The Optical Time Domain Reflectometry (OTDR) or Optical Frequency Domain Reflectometry (OFDR) combined with OLS is a successful method to measure attenuation and splice loss, and to locate the fault with high resolution and high sensitivity in the Optical Distribution Network (ODN).

Action 205. The network unit 14 then analyses a trace from the OxDR measurement for localizing the fault or for deciding that the indicated fault is not a fault along the fiber line. This may be done by comparing to a trace previously measured and if the trace differs from the previous trace a fault may have occurred.

Action 206. The network unit 14 may, when the trace indicate no fault, further check a photo diode at the radio base station 10 or the network unit 14, and/or a laser diode of a receiving unit in the FTTRh communications network. This is done to determine whether the photo diode and/or the laser diode is working properly. The receiving unit may be a RoF slave, a radio head or similar.

Action 207. The network unit 14 may, when the trace indicates the fault, report fiber fault to an operator of the network unit 14 or a node. E.g. to a node comprising a Network Management System.

In some embodiments the network unit 14 may be a standalone unit or collocated with the radio base station 10. The network unit 14, when being a standalone unit, may be operable in two modes, a continuous light source mode for detecting the indication and a trace measure mode for performing the OxDR measurement. The network unit 14, when being a standalone unit, may be tuneable for adjusting wavelengths. The network unit 14, when being a standalone unit, may be connectable to the fiber line with a red and blue filter for directing light and/or a tap off connection for tapping off light from the fiber line.

The FTTRh communications network may comprise nodes or drop lines with reflectors arranged at least a certain distance from one another to differentiate one another in the trace. This enables monitoring of dark fiber lines. Dark fiber lines means herein when no transmission is being executed along the fiber line and no receiving unit is not communicating with the radio base station 10. The certain distance may be achieved by a cassette with extra fiber connectable to a node or a drop line.

Figure 3:
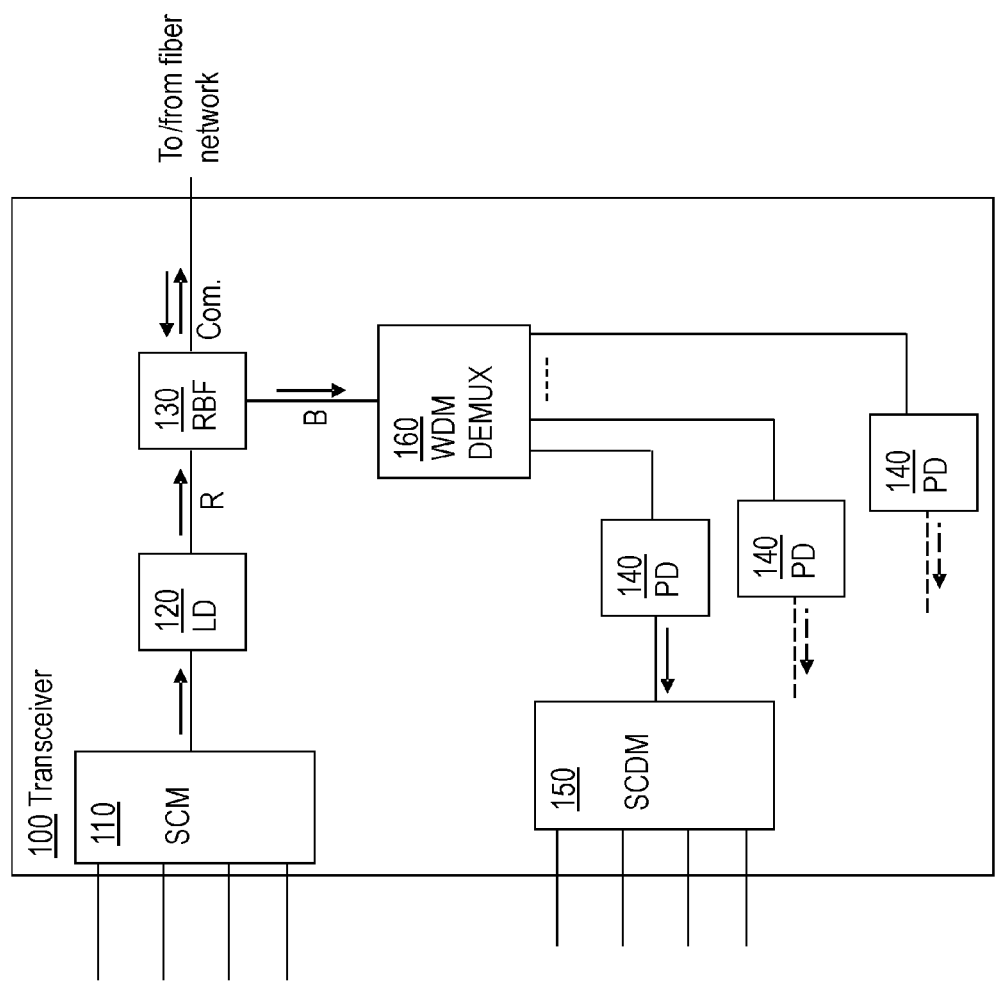
FIG. 3 is a block diagram depicting a transceiver in an FTTRh communications network.

Different embodiments for monitoring the fiber line are described below in FIGS. 4-7, in these embodiments the radio base station 10 comprises a transceiver 100 adapted for use in the FTTRh communications network. The transceiver 100 is schematically shown in FIG. 3. According to the illustrated example the transceiver 100 comprises a Sub-Carrier Multiplexing, SCM or SCM MUX, device 110. The SCM device 110 comprises at least two input ports and one output port, the SCM device 110 is adapted to receive electromagnetic signals on the at least two input ports, to multiplex the electromagnetic signals into a multiplexed electromagnetic signal and to output the multiplexed electromagnetic signal to a laser diode 120. The laser diode 120 is adapted to receive the multiplexed electromagnetic signal, to convert the multiplexed electromagnetic signal to optical signals comprising a plurality of sub-carriers of different wavelengths distributed in frequency around a main optical carrier, and to output the plurality of subcarriers to a red channel of a Red-Blue Filter 130, RBF, having the red channel, a blue channel and a common channel. The RBF 130 is adapted to receive the plurality of subcarriers, and to output the subcarriers to the fiber network via the common channel. The RBF 130 is further adapted to receive subcarriers on the common channel and to filter out blue frequencies of the received subcarriers and to output the subcarriers having blue wavelengths to a Photo Diode 140, PD. The PD 140 is adapted to receive the subcarriers having blue wavelengths from the RBF 130, convert the subcarriers into an electromagnetic signal and to output the electromagnetic signal to a Sub-Carrier Demultiplexing, SCDM or SCM DEMUX, device 150. The SCDM device 150 is adapted to receive the electromagnetic signal, to demultiplex the electromagnetic signal into at least two electromagnetic signals and to output the at least two electromagnetic signals.

The transceiver 100 may be implemented in an Optical Backend Termination (OBT). The OBT is adapted to send and receive signals to/from at least two Optical Frontend Nodes (OFN) comprised in the fiber network, i.e. the fiber line, the OBT further comprising at least two photo diodes 140 and a Wavelength Division Demultiplexing device (WDMDEMUX) 160 arranged between RBF 130 and the photo diodes 140 by having an input of the Wavelength Division Demultiplexing device 160 connected to the blue channel of the RBF 130 and having at least two outputs, each output connectable to a respective photo diode 140. In some embodiments the transceiver 100 comprises at least two SCM devices 110 and at least two laser diodes 120, wherein the transceiver further comprises a Wideband Division Multiplexing (WDM) device arranged between the respective laser diodes 120 and the RFB (130). The WDM device having at least two inputs connected to a respective laser diode 120 and an output connected to the red channel of the RBF 130. The WDM device may be arranged to multiplex received subcarriers and to output the multiplexed subcarriers to the RBF 130.

Figure 4:
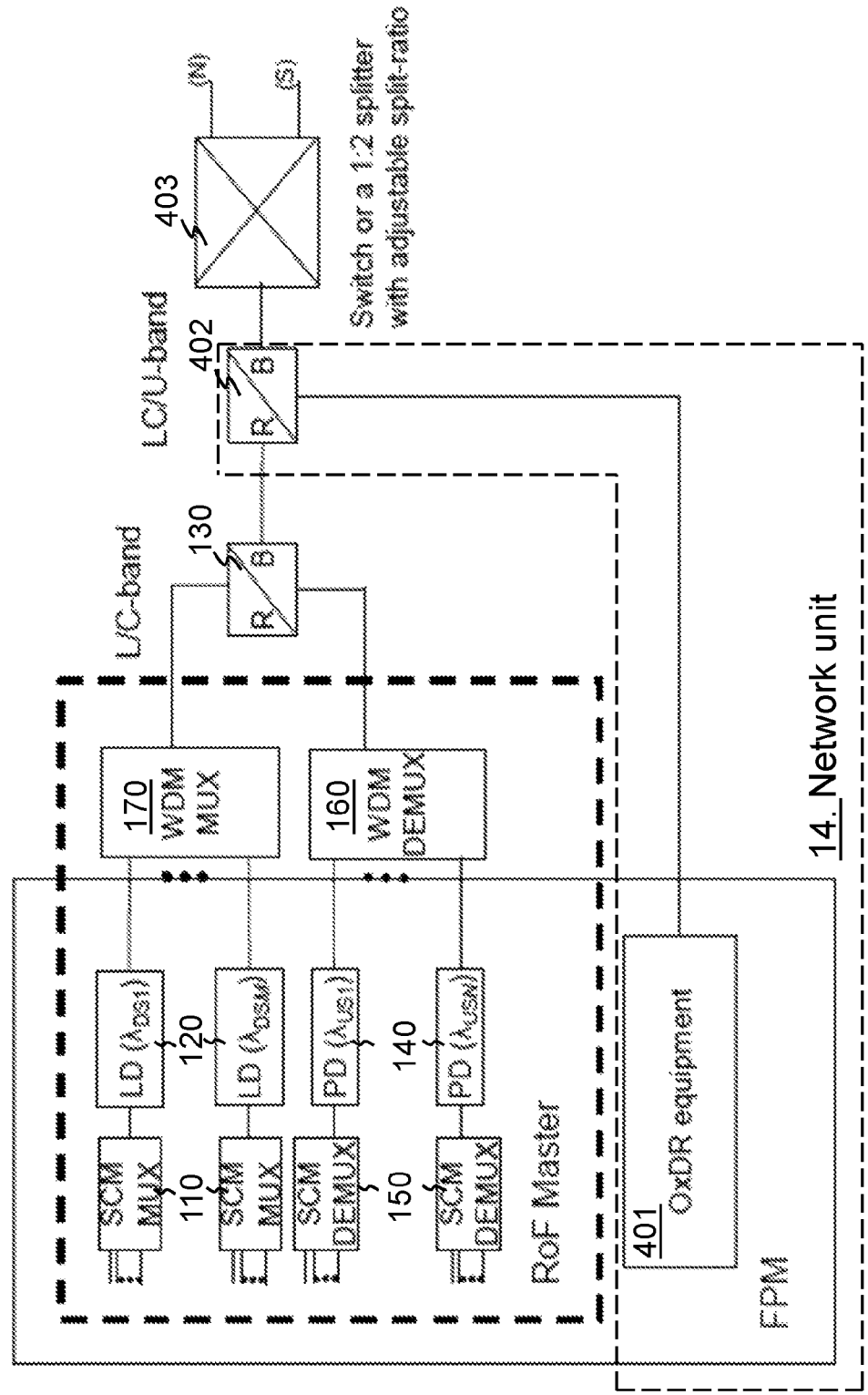
FIG. 4 is a block diagram depicting a network unit according to some embodiments herein.

FIG. 4 discloses a block diagram depicting an active approach according to embodiments herein. The network unit is this embodiment is collocated with the radio base station 10 and is connected to a RoF master of the radio base station 10. The network unit 14 may comprise a Fiber Plant Manager (FPM) for monitoring the fiber line, which is a centralized monitoring system that allows the network operator to detect, localize and measure faults, according to embodiments herein, with no help from field technicians or dependence on customer complaints. In general, the centralized monitoring system may be automatic and allow a Network Management System (NMS) to receive network diagnostics data remotely from the CO in real-time, with no need for interference from the customer. FPM relies on a mapping between the OLS, RoF master received power per RoF slave, and the result of the trace from the O×DR measurement. In these embodiments the FPM communicates between RoF master and an O×DR equipment 401. The architecture is shown in FIG. 4.

An RoF master comprises a number of SCM MUX 110 each connected to a respective LD 120. The LDs 120 is connected to a WDM multiplexor 170. The RoF master further comprises the WDM DEMUX 160 connected to a number of PDs 140 with a respective SCM DEMUX 150. The RoF master is connected to the RB filter 130 for filtering the different wavelengths. The O×DR equipment 401 is connected to the fiber line via a RB filter 402 and a switch 403 or a 1:2 splitter with adjustable split ratio.

In this approach there is a 1:1 mapping between the faulty line-segment or OFN and received power in the RoF Master if the OFN are coloured. The decreased power in one of the colours will spot the fault in the fiber line immediately, see action 203 above. Note that the decreased power will not determine the location of the fault neither its magnitude, which embodiments herein use the O×DR equipment 401 to do.

Figure 2:
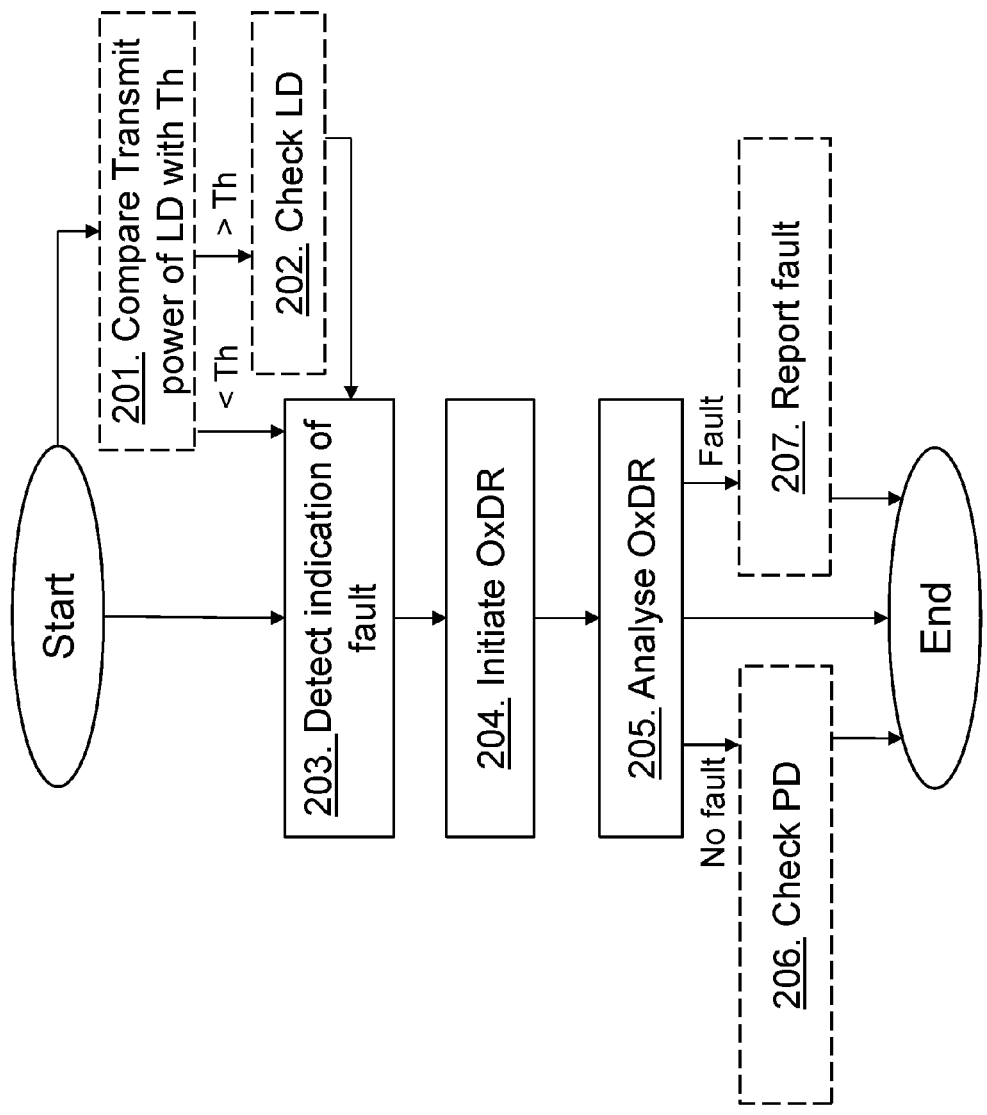
FIG. 2 is a schematic flowchart depicting a method for monitoring a fiber line according to embodiments herein.
Figure 5:
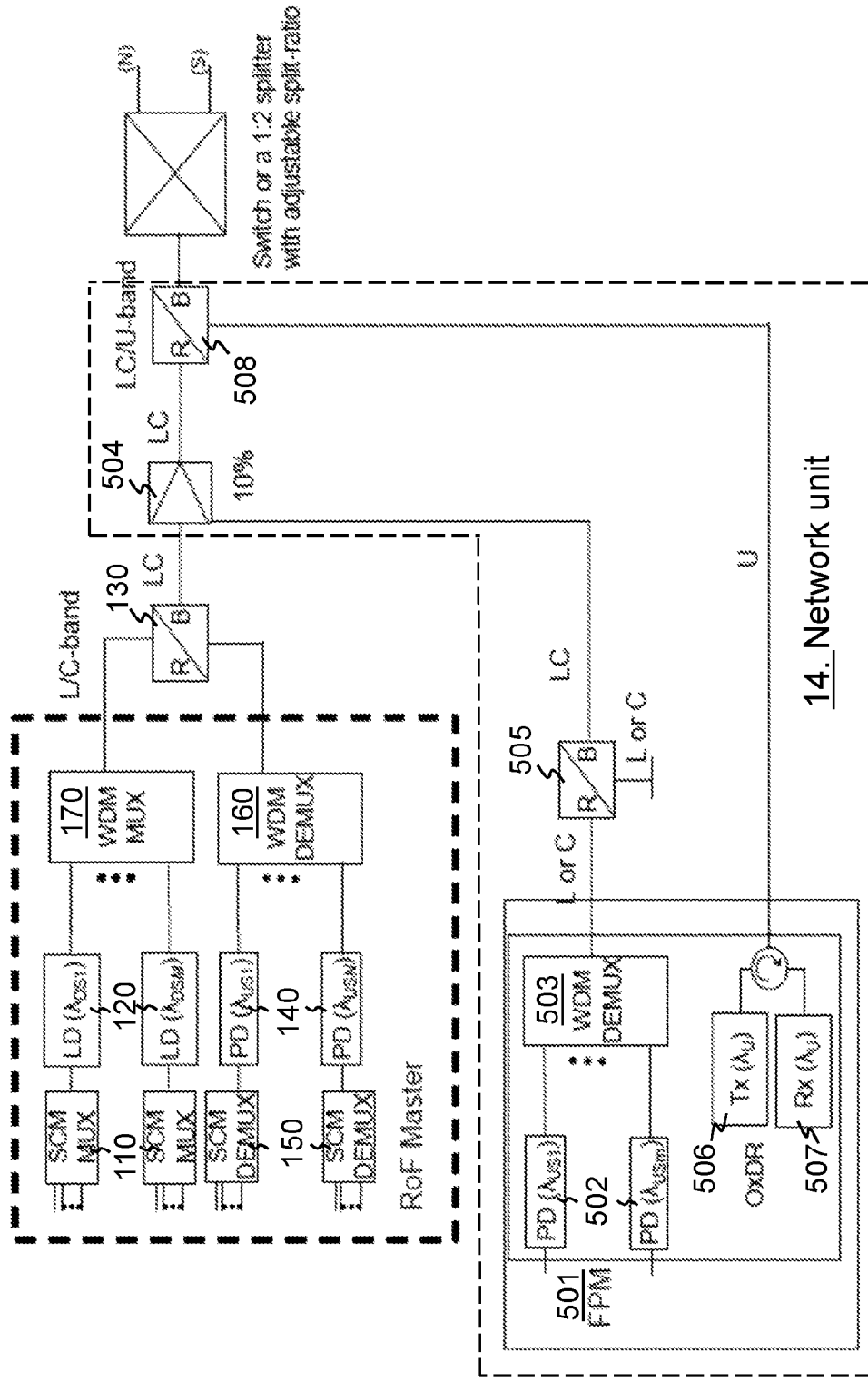
FIG. 5 is a block diagram depicting a network unit according to some embodiments herein.

Hence describing the method in the network unit 14 with reference to FIG. 4 and also to FIG. 2:
41. FPM reads Tx power from LD 120 in the RoF master. This is an example of action 201 in FIG. 2.
    a. Value violating a threshold go to 42
    b. Value not violating a threshold go to 43
42. Check master LD 120. This corresponds to action 202 in FIG. 2.
43. FPM reads Rx power from PD 140 in RoF master
    a. Value not violating a threshold go to 44
    b. Value violating a threshold (fault along the fiber line or segment of the fiber line is spotted) go to 45. This is an example of action 203 in FIG. 2.
44. Keep on monitoring
45. FPM sets an O×DR measurement. That is initiates process of the O×DR equipment 401. This is an example of action 204 in FIG. 2.
46. FPM analyses the trace. This an example of action 205 in FIG. 2.
    a. Trace shows no faults go to 47
    b. Trace shows one or more faults go to 48
47. If the trace does not show any faults, check master PD 140 and slave LD, not shown. This is an example of action 206 in FIG. 2.
48. Report fiber fault. This is an example of action 207 in FIG. 2.
49. Obtain line+distance report
50. Troubleshoot FIG. 5 discloses a block diagram depicting an open access approach according to embodiments herein. The network unit 14 may comprise a FPM also in this case, however, the network unit 14 is a standalone unit is this embodiment. In the event that FPM has no access to OLS data from the Master and Slave's transceivers (TRx), another option would be to spot the fault along the fiber line by measuring the upstream carrier light spectrum. This requires additional hardware and software at an O×DR device or equipment or FPM 501 and in the ODN in order to tap off and detect a percentage of the upstream power to be used to monitor the fiber line, as shown in FIG. 5. L, C and U bands of wavelengths all have different wavelength intervals.

As stated above, the RoF master may comprise a number of SCM MUX 110 each connected to a respective LD 120. The LDs 120 is connected to the WDM multiplexor 170. The RoF master further comprises the WDM DEMUX 160 connected to a number of PDs 140 with a respective SCM DEMUX 150. The RoF master is connected to the RB filter 130 for filtering the different wavelengths.

The FPM 501 comprises one or more PDs 502 connected to a WDM DEMUX 503 enabling the FPM 501 to power monitor the fiber line via a tapping off connection 504 for detecting the indication of a fault. The tapping off connection 504 taps of e.g. 10% of the power. A RB filter 505 may also be implemented in the connection between the FPM 501 and the tapping off connection 504 for directing the light. The FPM 501 may further comprise an O×DR device comprising a transmitter (Tx) 506 and a receiver (Rx) 507 for generating the trace for localizing the fault or to determine that the indicated fault is not a fault along the fiber line. The wavelengths U are transported over a connection via a RB 508 filtering out the U band.

This embodiment is called open access approach and it is of use in those deployments where the service provider is a different entity than the infrastructure owner, i.e. one company provides the services and one company provides the network.

In this case, the FPM 501 is able to detect both the fault along the fiber line and/or segment of the fiber line, and distance to the fault by comparing received optical power from a reference value and performing trace analysis.

Hence describing the method with reference to FIG. 5 and also to FIG. 2:
51. FPM 501 detects a percentage of the Upstream (US) power e.g. from the PD 502. This is an example of action 203 in FIG. 2.
    a. power not violating a threshold→go to 52
    b. power violating a threshold→go to 53
52. Keep on monitoring
53. FPM 501 sets an O×DR measurement. E.g. the Tx transmits a wavelength. This is an example of action 204 in FIG. 2.
54. FPM 501 analyses the trace based on result from the Rx 507. This is an example of action 205 in FIG. 2.
    c. Trace shows no faults go to 55 d. Trace shows one or more faults go to 56
55. Check FPM PD 502. This is an example of action 206 in FIG. 2.
56. Report fiber fault. This is an example of action 207 in FIG. 2.
57. Obtain line+distance report
58. Troubleshoot FIG. 6 discloses a block diagram depicting an approach enabling monitoring of a dark fiber, that is, no data communication in the fiber line, according to embodiments herein. As stated above, the RoF master comprises a number of SCM MUX 110 each connected to a respective LD 120. The LDs 120 is connected to the WDM multiplexor 170. The RoF master further comprises the WDM DEMUX 160 connected to a number of PDs 140 with a respective SCM DEMUX 150. The RoF master is connected to the RB filter 130 for filtering the different wavelengths.

Figure 6:
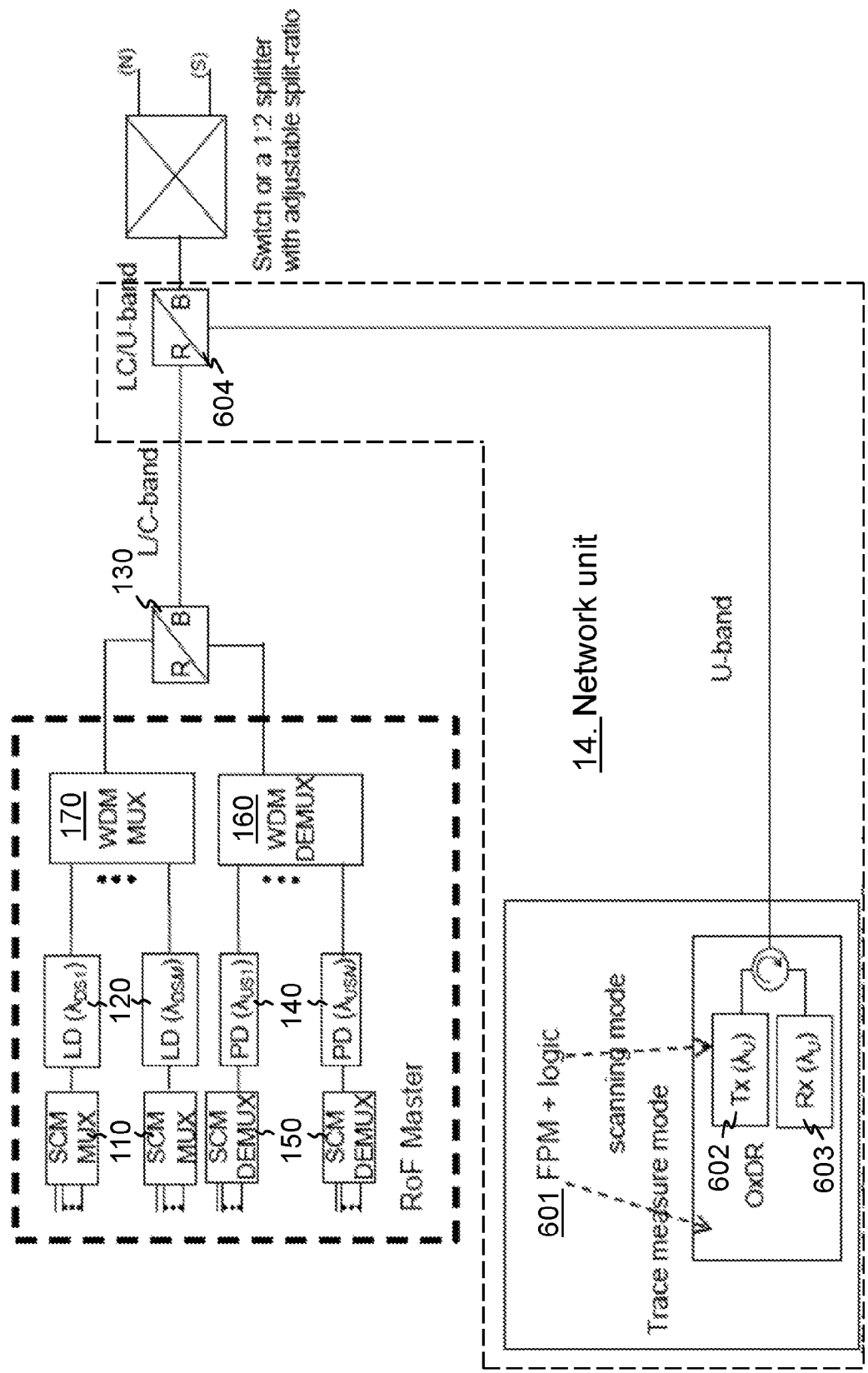
FIG. 6 is a block diagram depicting a network unit according to some embodiments herein.

In order to be able to monitor dark fiber, the network unit 14, being a standalone unit, may be implemented that is able to switch between two operations: 1) a continuous wave (CW) source operation, also called continuous light source mode, performing optical power measurement; 2) a trace measure mode, as shown in FIG. 6.

In a first step, the network unit 14 comprises a FPM+logic 601 or an OxDR-capable device that operates in the continuous light source mode, also called power-measurement mode or scanning mode, to monitor the power of any group of drop-line, as stated in action 203 above. The FPM+logic 601 comprises a Tx 602 and a Rx 603 that in the continuous light source mode detects the indication and in the trace measure mode performs the OxDR measurement. A RB filter 604 connects the FPM+logic 601 to the fiber line.

In this configuration at least one reflector per ribbon fiber is placed at the customer premises. Because of the use of reflectors a minimum of 5 m fiber difference is needed to discern different drop lines. That is, in order to differentiate the reflecting signals from different nodes in the FTTRh communications network there need to be a certain distance between the nodes. The extra fiber length needed may be calculated according to the flow below:

| | |
|---|---|
| L[1] = 0; | // L[i] - extra fiber needed at i-th drop |
| Lt[1] = 0; | // Lt[i] - total extra fiber up to and incl. i-th //drop |
| for (i = 1; i++; i <= x-1) | // x - total number of drops connected to //a ring |
| { | |
| v = R[i]+D[i+1]−D[i]; | // v - a variable representing the //difference of fiber length between the //drop connected to the i-th node, D[i], //and the (i+1)-th node, D[i+1], with ring //segment in between the two nodes, R[i] |
| if (v < 0) L[i+1] = −v+5; | // If the difference is lower than 0, drop //D[i+1] should be extended with L[i+1] //composed of the calculated difference //and extra 5m |
| if (v = 0) L[i+1] = 5; | // If the difference is 0, only 5m of extra //fiber is needed at D[i+1] |
| Else L[i+1] = 0; | // If the difference is higher than 0, no //extra fiber is needed |
| Lt[i+1] = Lt[i] + L[i+1]; | // Total extra fiber length needed |
| } | |

The above calculation is much simplified. Practically, one would need to take into account that the reflectors need to be spaced with minimum 5 m but not necessarily in a consecutive order as is the case the above calculations address. In other words, the reflectors may be placed in a random order on a ring circumference. This may lead to the reduction of extra fiber needed.

The extra length in fiber may be achieved by means of a cassette attached at the end of any drop fiber. This is the case when all drop fibers in the given system are dark and do not share a ribbon. Otherwise, the number of reflectors will reduce and the required extra fiber length as well.

Hence describing the method with reference also to FIG. 2:
61. FPM+logic 601 sets the logic in the OxDR to the continuous light source mode to monitor the optical power in the fiber line
62. FPM+logic 601 scans the received power. This is an example of action 203 in FIG. 2.
  a. power not violating a threshold→go to 63
  b. power violating a threshold→go to 64
63. Keep on monitoring
64. FPM+logic 601 sets the logic in the OxDR box to trace measurement. This is an example of action 204 in FIG. 2.
65. FPM+logic 601 analyses the trace. This is an example of the action 205 in FIG. 2.
  a. Trace shows no faults go to 66
  b. Trace shows one or more faults go to 67
66. Check Rx 603 in the FPM+logic 601. This is an example of action 206 in FIG. 2.
67. Report fiber fault. This is an example of action 207 in FIG. 2.
68. Obtain line+distance report
69. Troubleshoot The network unit 14 may thus operate in two modes:
A first mode being a continuous light source. In this mode only the tuneable source may be enabled and it sends continuous light to the ODN;
A second mode being a trace measure mode. In this mode, the network unit 14 gathers the information to perform a trace analysis.

The first mode is used for monitoring the backscattered/backreflected total power from a given drop-link group, the second mode is used to analyze the backscattered light, and thus obtain the trace to localize the fault.

Figure 7:
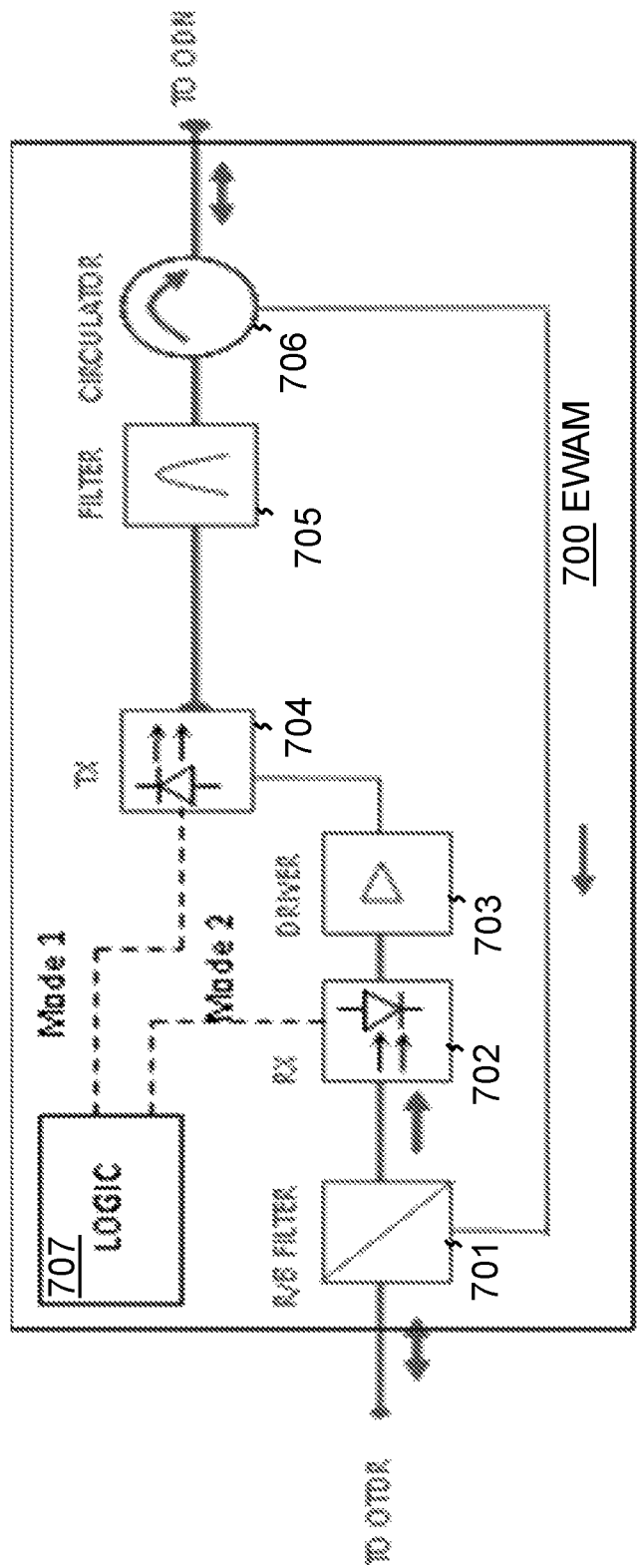
FIG. 7 is a block diagram depicting a network unit according to some embodiments herein.

FIG. 7 is a block diagram depicting an external wavelength adaptation module (EWAM) 700 being a part of the network unit 14.

The EWAM 700 comprises a RB filter 701, a Rx 702, a driver 703 and a Tx 704. The EWAM 700 further comprises a filter 705 and a circulator 706. The EWAM 700 according to embodiments herein is added with added extra functionality, a logic 707 shown in FIG. 7. This logic 707 controls the photodiode, receiver, and the tuneable source. The EWAM 700 may operate in two modes:
1) The first mode; as a continuous light source mode. In this mode only the tuneable source is enabled and it sends continuous light to the ODN;
2) The second mode; as a trace measurement mode or pulsed light source. In this mode, the network unit 14 sends the pulse which is read by the photodiode in the EWAM box which in turn feeds the, modulator, driver 703 so the wave sent to the ODN is now pulsed.

The first mode is used for monitoring the backscattered/backreflected total power from a given drop-link group, the second mode is used to analyze the backscattered light, and thus obtain the OTDR trace to localize the fault or to determine that the indicated fault is not a fault along the fiber line.

Figure 8:
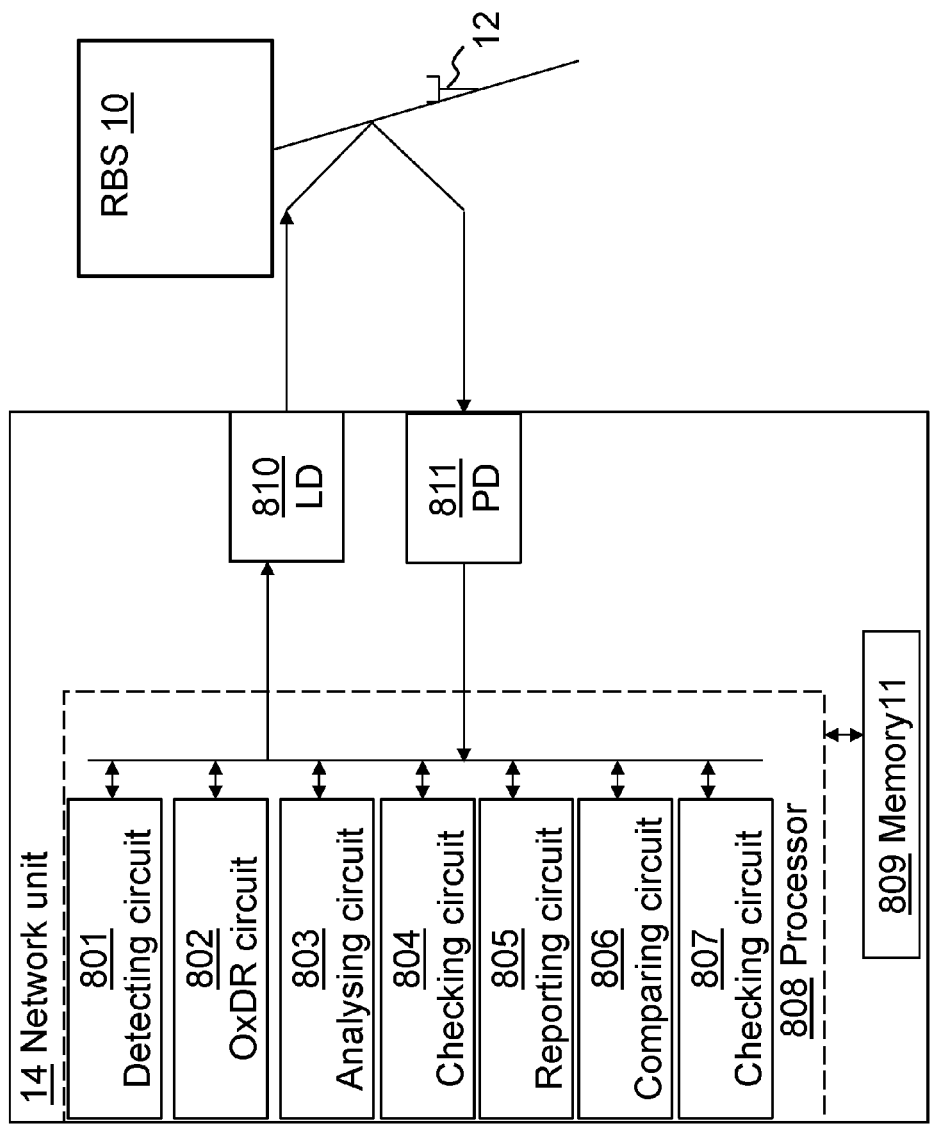
FIG. 8 is a block diagram depicting a network unit according to embodiments herein.

The EWAM 700 adds tuneability in the architecture. Tuneability might be required i) in case of OFNs that are wavelength specific and ii) it might be useful to detect wavelength specific fiber properties FIG. 8 is a block diagram depicting the network unit 14 for monitoring the fiber line between the radio base station 10 and one or more radio heads 12 in the FTTRh communications network according to embodiments herein. The FTTRh communications network comprises a ring architecture or a tree architecture of fiber, with SCM downstream transmissions and WDM upstream transmissions.

The network unit 14 comprises a detecting circuit 801 configured to detect an indication of a fault along the fiber line based on monitored power. The detecting circuit 801 may be configured to detect the indication based on at least one of: read receiver power from a photo diode in a Radio over Fiber master; detected upstream power to the Radio over Fiber master; and received power.

The network unit 14 further comprises an OxDR circuit 802 configured to initiate, in response when the indication is detected, an OxDR measurement over the fiber line.

Furthermore, the network unit 14 comprises an analyzing circuit 803 configured to analyse a trace from the OxDR measurement for localizing the fault or for deciding that the indicated fault is not a fault along the fiber line.

The network unit 14 may further comprise a checking circuit 804 configured, when the trace indicate no fault, to check a photo diode of the radio base station 10 or the network unit 14 and/or a laser diode of a receiving unit connected to the radio head 12 in the communications network.

The network unit may also comprise a reporting circuit 805 configured to report the fault when the trace indicates fault to an operator of the network unit 14 or a node.

In some embodiments, e.g. FIGS. 5-7, the network unit 14 is a standalone unit. The network unit 14 may also be collocated with the radio base station 12, see FIG. 4. The network unit 14 may, when being a standalone unit, be configured to operate in two modes, a continuous light source mode for detecting the indication and a trace measure mode for performing the OxDR measurement. The network unit 14 may, when being a standalone unit, be configured to adjust wavelengths, see FIG. 7. The network unit 14 may, when being a standalone unit, comprise a red and blue filter, e.g. RB filter 508, or RB filter 604, connecting the network unit 14 to the fiber and for directing light, and/or a tap off connection, e.g. tap off connection 504, for tapping off light from the fiber line.

In some embodiments the Fiber to the Radio Head communications network comprises nodes or drop lines with reflectors arranged at least a certain distance from one another to differentiate one another in the trace. The network unit 14 may further comprise a cassette with extra fiber connectable to a node or a drop line to achieve the certain distance.

The network unit 14 may further comprise a comparing circuit 806 configured to compare transmit power of a laser diode in a Radio over Fiber master against a threshold value. The Radio over Master may be comprised in the radio base station 10.

The network unit 14 may also comprise a checking circuit 807 configured to check the laser diode when transmit power exceeds the threshold value.

The embodiments herein for monitoring the fiber line between the radio base station 10 and one or more radio heads 12 may be implemented through one or more processors 808 in the network unit 14 depicted in FIG. 8, together with computer program code for performing the functions and/or method actions of the embodiments herein. The program code mentioned above may also be provided as a computer program product, for instance in the form of a data carrier carrying computer program code for performing embodiments herein when being loaded into the network unit 14. One such carrier may be in the form of a CD ROM disc. It is however feasible with other data carriers such as a memory stick. The computer program code may furthermore be provided as pure program code on a server and downloaded to the network unit 14.

The network unit 14 may further comprises a memory 809, which may comprises one or more memory units and may be configured to have data stored thereon, such as thresholds, power levels, traces, OxDR measurements, applications to perform the methods herein when executed on the network unit 14, and/or similar.

The network unit 14 may further comprise one or more LDs 810 and/or one or more PDs 811.

In some embodiments, a computer program product is provided comprising computer-executable instructions which, once executed by the processor 808 in the network unit 14, causes the network unit 14 to perform a method according to the embodiments above.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method in a network unit for monitoring a fiber line between a radio base station and a radio head in a Fiber to the Radio head communications network, which Fiber to the Radio head communications network comprises a ring architecture or a tree architecture of fiber, with Subcarrier Multiplexing (SCM) downstream transmissions and Wavelength Division Multiplexing (WDM) upstream transmissions, the network unit comprising a processor and one or more processing circuits, the method comprising:
   determining if a laser diode at a Radio over Fiber (RoF) master is working properly;

when the laser diode is working properly, detecting an indication of a fault along the fiber line based on one of read receiver power from a photo diode in a RoF master and detected upstream power to the RoF master;
in response to the detected indication, initiating an Optical×Domain Reflectometry (O×DR) measurement over the fiber line; and
analyzing a trace from the O×DR measurement for localizing the fault or for deciding that the indicated fault is not a fault along the fiber line,
wherein the downstream transmissions and the upstream transmissions are on the same path.

2. A method according to claim 1, further comprising
when the trace indicates no fault, checking a photo diode at the radio base station or the network unit and/or a laser diode of one of a RoF slave and radio head associated with the RoF master in the communications network, and
when the trace indicates fault, reporting the fiber fault to an operator of the network unit or a node.

3. A method according to claim 1, wherein the network unit is a standalone unit or collocated with the radio base station.

4. A method according to claim 3, wherein the network unit is a standalone unit, and is operable in two modes, a continuous light source mode for detecting the indication and a trace measure mode for performing the O×DR measurement.

5. A method according to claim 3, wherein the network unit is a standalone unit, and is tuneable for adjusting wavelengths.

6. A method according to claim 3, wherein the network unit is a standalone unit, and is connectable to the fiber line with a red and blue filter for directing light and/or a tap off connection for tapping off light from the fiber line.

7. A method according to claim 1, wherein the Fiber to the Radio head communications network comprises nodes or drop lines with reflectors arranged at least a certain distance from one another to differentiate one another in the trace.

8. A method according to claim 7, wherein the certain distance is achieved by a cassette with extra fiber connectable to a node or a drop line.

9. A method according to claim 1, wherein determining the status of the laser diode further comprises:
comparing transmit power of a laser diode in a Radio over Fiber master against a threshold value; and
when transmit power exceeds the threshold value, checking the laser diode.

10. A network unit for monitoring a fiber line between a radio base station and a radio head in a Fiber to the Radio head communications network, which Fiber to the Radio head communications network comprises a ring architecture or a tree architecture of fiber, with Subcarrier Multiplexing (SCM) downstream transmissions and Wavelength Division Multiplexing (WDM) upstream transmissions, wherein the network unit comprises, for monitoring the fiber line:
a processor;
a checking circuit configure to determine if a laser diode at a Radio over Fiber (RoF) master is working properly;
a detecting circuit configured to detect an indication of a fault along the fiber line based on monitored power, when the laser diode is working properly, based on one of read receiver power from a photo diode in a RoF master and detected upstream power to the RoF master;
an Optical×Domain Reflectometry (O×DR) circuit configured to initiate, in response to the indication being detected, an O×DR measurement over the fiber line; and
an analyzing circuit configured to analyse a trace from the O×DR measurement for localizing the fault or for deciding that the indicated fault is not a fault along the fiber line,
wherein the downstream transmissions and the upstream transmissions are on the same path.

11. A network unit according to claim 10, further comprising
a checking circuit configured, when the trace indicates no fault, to check a photo diode at the radio base station or the network unit and/or a laser diode of one of a RoF slave and radio head associated with the RoF master in the communications network, and
a reporting circuit configured, when the trace indicates fault, to report the fault to an operator of the network unit or a node.

12. A network unit according to claim 10, wherein the network unit is a standalone unit or collocated with the radio base station.

13. A network unit according to claim 12, wherein the network unit is a standalone unit, and is configured to operate in two modes, a continuous light source mode for detecting the indication and a trace measure mode for performing the O×DR measurement.

14. A network unit according to claim 12, wherein the network unit is a standalone unit, and is configured to adjust wavelengths.

15. A network unit according to claim 12, wherein the network unit is a standalone unit, and comprises a red and blue filter connecting the network unit to the fiber and for directing light, and/or a tap off connection for tapping off light from the fiber line.

16. A network unit according to claim 10, wherein the Fiber to the Radio head communications network comprises nodes or drop lines with reflectors arranged at least a certain distance from one another to differentiate one another in the trace.

17. A network unit according to claim 16, further comprising a cassette with extra fiber connectable to a node or a drop line to achieve the certain distance.

18. A network unit according to claim 10, further comprising:
a comparing circuit configured to compare transmit power of a laser diode in a Radio over Fiber master against a threshold value when determining the status of the laser diode; and
a checking circuit further configured to check the laser diode when transmit power exceeds the threshold value.

19. A computer readable medium containing computer-executable instructions which, once executed by a processor in a network unit, causes the network unit to perform the method of claim 1.

* * * * *